(12) United States Patent
Hardy et al.

(10) Patent No.: US 7,881,243 B2
(45) Date of Patent: Feb. 1, 2011

(54) METHOD AND APPARATUS CAPABLE OF UNIFIED MULTI-TRANSPORT MESSAGE HANDLING

(75) Inventors: Michael Thomas Hardy, Waterloo (CA); Peter Tysowski, Waterloo (CA); Robin Glennie, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 705 days.

(21) Appl. No.: 11/865,876

(22) Filed: Oct. 2, 2007

(65) Prior Publication Data

US 2009/0088189 A1 Apr. 2, 2009

(51) Int. Cl.
*H04H 20/71* (2008.01)
*H04L 12/56* (2006.01)
*H04J 3/26* (2006.01)
*H04W 4/00* (2009.01)

(52) U.S. Cl. .................... 370/312; 370/390; 370/432; 455/466

(58) Field of Classification Search ................ 370/349, 370/389–390, 392–393, 432, 471, 473–475; 455/412.1, 412.2, 466, 556.2; 709/206, 227–228, 709/245
See application file for complete search history.

(56) References Cited

U.S. PATENT DOCUMENTS

| | | | |
|---|---|---|---|
| 6,151,507 A | | 11/2000 | Laiho et al. |
| 7,013,350 B2* | | 3/2006 | Enns et al. .................. 709/245 |
| 7,069,301 B2 | | 6/2006 | Jerbi et al. |
| 7,277,719 B2* | | 10/2007 | Klassen et al. .............. 455/466 |
| 2002/0137530 A1 | | 9/2002 | Karve |
| 2002/0152220 A1 | | 10/2002 | Kang et al. |
| 2003/0048790 A1* | | 3/2003 | McAllister et al. ........ 370/395.2 |
| 2004/0057403 A1 | | 3/2004 | Jerbi et al. |
| 2007/0087766 A1* | | 4/2007 | Hardy et al. ................ 455/466 |
| 2007/0088787 A1 | | 4/2007 | Hardy et al. |
| 2007/0287485 A1* | | 12/2007 | Klassen et al. ............. 455/466 |

FOREIGN PATENT DOCUMENTS

| | | | |
|---|---|---|---|
| EP | 1037451 A2 | | 9/2000 |
| EP | 1322126 A1 | | 6/2003 |
| EP | 1484703 A1 * | | 12/2004 |
| EP | 1583301 A1 | | 10/2005 |
| EP | 1775971 A1 | | 4/2007 |
| EP | 1802056 A1 | | 6/2007 |
| WO | 02/07379 A2 | | 1/2002 |
| WO | 2004012109 A1 | | 2/2004 |

(Continued)

OTHER PUBLICATIONS

Extended European Search Report issued on Apr. 2, 2008 in connection with corresponding EP application No. EP07117791.9.
Margit C.M. Biemans et al, User Evaluations to Guide the Design of an Extended Personal Service Environment for Mobile Services, ISWC, 2001, pp. 94-101, IEEE Computer Society, Los Alamitos, CA, USA.

(Continued)

*Primary Examiner*—Tri H Phan
(74) *Attorney, Agent, or Firm*—Ridout & Maybee LLP

(57) ABSTRACT

Upon obtaining a message object that specifies a plurality of destination addresses, a multi-transport client selects a candidate destination address from among the plurality of destination addresses, determines the transport associated with the candidate destination address and arranges for transmission of a portion of the message over the determined transport toward the candidate destination address.

17 Claims, 8 Drawing Sheets

FOREIGN PATENT DOCUMENTS

| | | |
|---|---|---|
| WO | 20041066648 A1 | 8/2004 |
| WO | 20041086701 A1 | 10/2004 |
| WO | 20051067435 A2 | 7/2005 |

OTHER PUBLICATIONS

Shoutmail Internet Voice Portal! http://web.archive.org/web/20001205184400/http://shoutmail.com/.

* cited by examiner

METHOD AND APPARATUS CAPABLE OF UNIFIED MULTI-TRANSPORT MESSAGE HANDLING

FIELD OF THE INVENTION

The present application relates to message handling and, in particular, to a method and apparatus capable of handling a message for transmission on multiple transports.

BACKGROUND OF THE INVENTION

Current mobile wireless communication devices provide features beyond basic wireless telephony that include an ability to send and receive Short Message Service (SMS) messages, an ability to send and receive e-mail messages and an ability to browse online information formatted using either the known Wireless Application Protocol (WAP) or the known Hyper-Text Transfer Protocol (HTML).

Each of the features is typically implemented in a separate client application executed on the wireless communication device. To implement the features outlined above as examples, an exemplary wireless communication device may require an SMS client application, an e-mail client application, a WAP browsing application and an HTML browsing application.

Unfortunately, when a user of the exemplary wireless communication device is intent on forwarding an SMS message to a recipient associated with an e-mail address, the user is required to copy, to a temporary memory (often referred to as a "clipboard"), the payload of the SMS message while using the SMS client application to review the SMS message. The user is then required to exit the SMS client application and initialize the e-mail client application. While in the e-mail client application, the user may then take steps to create and edit a new outgoing e-mail message. Responsively, the e-mail client application may present a user interface screen with various text fields corresponding to fields of a standard e-mail message. Such fields typically include a field for indicating a recipient, a field for indicating a subject and a field for the body of the e-mail message. The user may then paste the previously copied payload of the SMS message into the text field of the user interface screen, which text field corresponds to the body field of the new outgoing e-mail message, specify a subject and a recipient in the respective fields and then direct the e-mail client application to send the new outgoing message.

Such a set of actions may not be considered intuitive to the user and may be found to be tedious and time consuming.

BRIEF DESCRIPTION OF THE DRAWINGS

In the figures which illustrate example embodiments of this application.

DETAILED DESCRIPTION OF THE EMBODIMENTS

Upon receiving a message that specifies a plurality of destination addresses, a multi-transport capable messaging client selects a candidate destination address from among the plurality of destination addresses, determines the transport associated with the candidate destination address and arranges for transmission of at least a portion of the message over the determined transport toward the candidate destination address.

In accordance with an aspect of the present application, there is provided a method of handling a first message for transmission. The method includes obtaining a first message, the first message specifying a plurality of destination addresses, and selecting a candidate destination address from among the plurality of destination addresses. The method further includes determining that the candidate destination address is not associated with a first transport, determining that the candidate destination address is associated with a second transport and arranging for transmission of a portion of the first message over the second transport to the candidate destination address. Additionally, an apparatus is provided for carrying out this method and a computer readable medium is provided for containing instructions to allow a processor to carry out this method.

Other aspects and features of the present application will become apparent to those of ordinary skill in the art upon review of the following description of specific embodiments of the application in conjunction with the accompanying figures.

Figure 1:
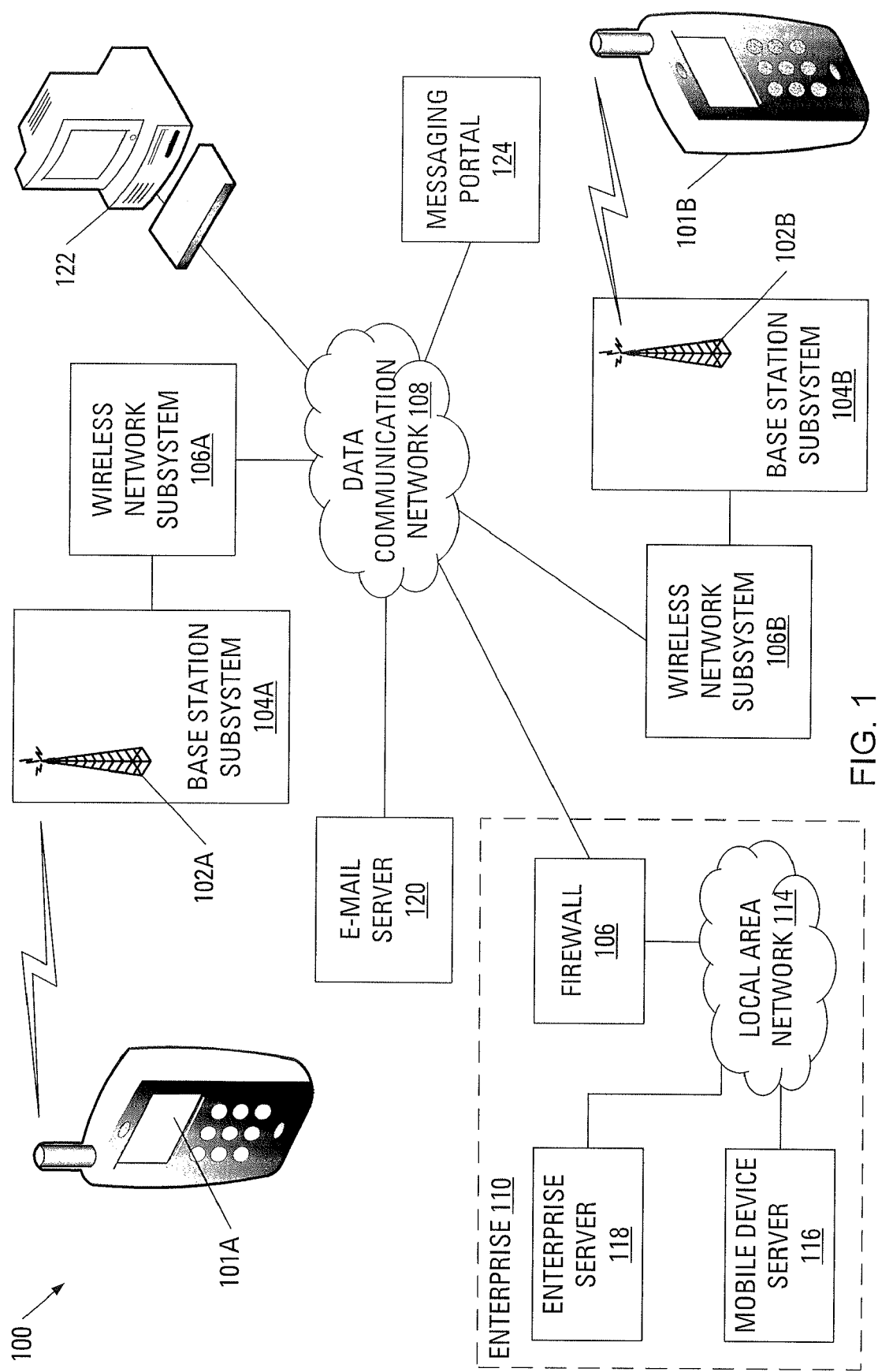
FIG. 1 illustrates elements of an exemplary network environment for a first wireless mobile communication device.

FIG. 1 illustrates elements of an exemplary network environment 100 for a first wireless mobile communication device 101A. The elements of the exemplary network environment 100 include multiple wireless carrier networks and a data communication network 108, which may be considered to represent at least one wide area network, such as the present day Internet and successors, as well as, potentially, multiple local area networks. A first base station antenna 102A, with which the first wireless mobile communication device 101A may communicate wirelessly, is provided as part of a first base station subsystem 104A.

The first base station subsystem 104A connects to a first wireless network subsystem 106A. In an exemplary Global System for Mobile communications (GSM) implementation, the first wireless network subsystem 106A includes, among other components, a Mobile Services Switching Center, a Home Location Register, a Visitor Location Register, a relay and a Short Messaging Service Center (SMSC). As illustrated in FIG. 1, the first wireless network subsystem 106A is connected to the data communication network 108.

Also connected to the data communication network 108 is a second wireless network subsystem 106B. Similar to the first wireless network subsystem 106A, the second wireless network subsystem 106B may include a Mobile Services Switching Center, a Home Location Register, a Visitor Location Register, a relay and an SMSC. The second wireless network subsystem 106B connects to a second base station subsystem 104B with a second base station antenna 102B. The second base station antenna 102B may allow the second base station subsystem 104B to communicate wirelessly with a second mobile device 101 B.

The first mobile device 101A may be associated with an enterprise 110 connected to the data communication network 108. The enterprise 110 may, for instance, include a firewall or proxy server 112 connecting to the data communication network 108 and to a local area network (LAN) 114. The LAN 114 may allow communication between a mobile device server 116 and an enterprise server 118 and between the servers 116, 118 and other network entities through the data communication network 108.

Also connected to the data communication network 108 may be an e-mail server 120 and a desktop computer 122, which may be associated with a user having an account on the e-mail server 120. Also connected to the data communication network 108 may be a messaging portal 124.

Figure 2:
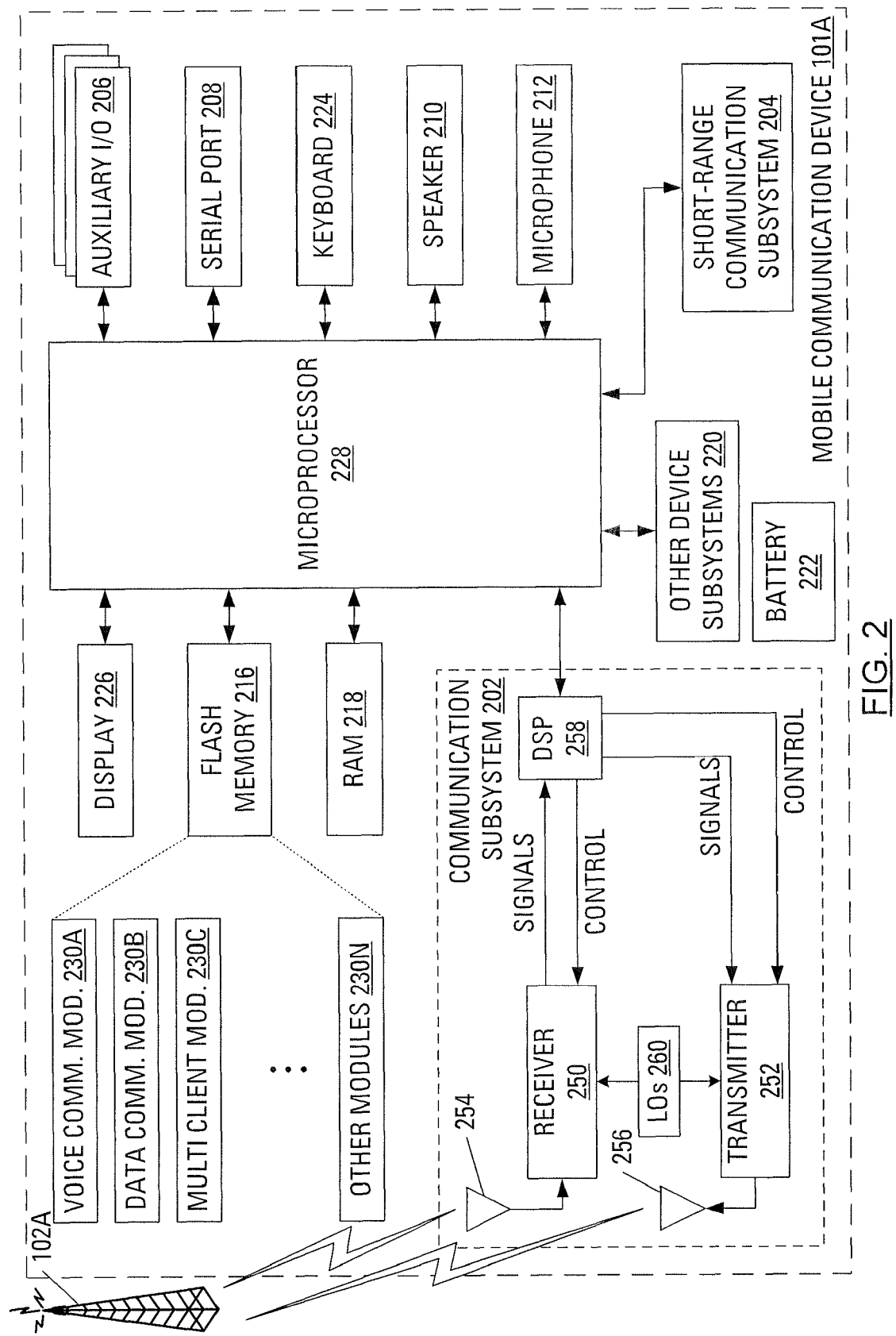
FIG. 2 illustrates components of the first wireless mobile data communication device of FIG. 1, according to an embodiment of the present application.

FIG. 2 illustrates the first wireless mobile communication device 101A including a housing, an input device (a keyboard 224), and an output device (a display 226), which is preferably a full graphic or full color Liquid Crystal Display (LCD). Other types of output devices may alternatively be utilized. A processing device (a microprocessor 228) is shown schematically in FIG. 2 as coupled between the keyboard 224 and the display 226. The microprocessor 228 controls the operation of the display 226, as well as the overall operation of the first mobile device 101A, in response to actuation of keys on the keyboard 224 by a user.

The housing may be elongated vertically, or may take on other sizes and shapes (including clamshell housing structures). The keyboard may include a mode selection key, or other hardware or software, for switching between text entry and telephony entry.

In addition to the microprocessor 228, other parts of the first mobile device 101A are shown schematically in FIG. 2. These include: a communications subsystem 202; a short-range communications subsystem 204; the keyboard 224 and the display 226, along with other input/output devices including a set of auxiliary I/O devices 206, a serial port 208, a speaker 211 and a microphone 212; as well as memory devices including a flash memory 216 and a Random Access Memory (RAM) 218; and various other device subsystems 220. The first mobile device 101A may have a battery 222 to power the active elements of the first mobile device 101A. The first mobile device 101A is preferably a two-way radio frequency (RF) communication device having voice and data communication capabilities. In addition, the first mobile device 101A preferably has the capability to communicate with other computer systems via the Internet.

Operating system software executed by the microprocessor 228 is preferably stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device may also be stored to the RAM 218.

The microprocessor 228, in addition to its operating system functions, enables execution of software applications on the first mobile device 101A. A predetermined set of software applications that control basic device operations, such as a voice communications module 230A and a data communications module 230B, may be installed on the first mobile device 101A during manufacture. A multi-transport client application module 230C may also be installed on the first mobile device 101A during manufacture, to implement aspects of the application. As well, additional software modules, illustrated as an other software module 230N, which may be, for instance, a personal information manager (PIM) application, may be installed during manufacture. The PIM application is preferably capable of organizing and managing data items, such as e-mail messages, calendar events, voice mail messages, appointments, and task items. The PIM application is also preferably capable of sending and receiving data items via a wireless carrier network represented in FIG. 2 by the first base station antenna 102A. Preferably, the data items managed by the PIM application are seamlessly integrated, synchronized and updated via the wireless carrier network with the device user's corresponding data items stored or associated with a host computer system.

Communication functions, including data and voice communications, may be performed through the communication subsystem 202 and, possibly, through the short-range communications subsystem 204. The communication subsystem 202 includes a receiver 250, a transmitter 252 and one or more antennas, illustrated as a receive antenna 254 and a transmit antenna 256. In addition, the communication subsystem 202 also includes a processing module, such as a digital signal processor (DSP) 258, and local oscillators (LOs) 260. The specific design and implementation of the communication subsystem 202 is dependent upon the communication network in which the first mobile device 101A is intended to operate. For example, the communication subsystem 202 of the first mobile device 101A may be designed to operate with the Mobitex™, DataTAC™ or General Packet Radio Service (GPRS) mobile data communication networks and may also be designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Other types of data and voice networks, both separate and integrated, may also be utilized with the first mobile device 101A.

When required network registration or activation procedures have been completed, the first mobile device 101A may send and receive communication signals over the wireless carrier network. Signals received from the first base station antenna 102A by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the base station antenna 102A are processed (e.g., modulated and encoded) by the DSP 258 and are then provided to the transmitter 252 for digital to analog conversion, frequency up conversion, filtering, amplification and transmission to the first base station antenna 102A via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as an SMS message or web page download, is processed by the communication subsystem 202 and is input to the microprocessor 228. The received signal is then further processed by the microprocessor 228 in preparation for output to the display 226, or alternatively to some other auxiliary I/O devices 206. A device user may also compose data items, such as e-mail messages or SMS messages, using the keyboard 224 and/or some other auxiliary I/O device 206, such as a touchpad, a rocker switch, a thumb-wheel, or some other type of input device. The composed data items may then be transmitted to the base station antenna 102A via the communication subsystem 202.

In a voice communication mode, overall operation of the device is substantially similar to the data communication mode, except that received signals may be output to the speaker 211, and signals for transmission may be generated by the microphone 212. Alternative voice or audio I/O subsystems, such as a voice message recording subsystem, may also be implemented on the first mobile device 101A. In addition, the display 226 may also be utilized in voice communication mode, for example, to display the identity of a calling party, the duration of a voice call, or other voice call related information.

The short-range communications subsystem 204 enables communication between the first mobile device 101A and other proximate systems or devices, which need not necessarily be similar devices. For example, the short-range communications subsystem 204 may include an infrared device and associated circuits and components, or a Bluetooth™ communication module, to provide for communication with similarly-enabled systems and devices.

To create an outgoing e-mail message, it is typical for a user to interact with a user interface object (assuming the use of object-oriented programming techniques for the operational software code executed on the microprocessor 228). A new e-mail message object may be created as an instance of an e-mail message model class, which defines an organization of e-mail message payload, routing data and other metadata. The e-mail message model class may also identify those actions that may be performed on the e-mail message object, such as Send, Save Draft, etc. Such actions may be performed on the e-mail message object responsive to user interaction with the user interface object.

The actions that may be performed on an e-mail message object may be considered to relate to instances of "verb" classes that are specific to an e-mail message handling service that is external to the first mobile device 101A. As will be clear to a person of ordinary skill in the art of object oriented programming, a verb is an object encapsulation of an action in the Java™ programming language. A verb is often, but not necessarily, presented to the user as an item in a pull down menu or hotkey; a verb contains the code to perform the action on a related data model and may contain information on how to represent itself to the user.

An e-mail message Compose verb class may be associated with a default user interface screen object. Accordingly, while in view of the default user interface screen, a user may cause a menu to appear and may select a "Compose e-mail message" menu item. As a result of the selection of the "Compose e-mail message" menu item, the user interface object may instantiate the e-mail message Compose verb class.

Figure 3:
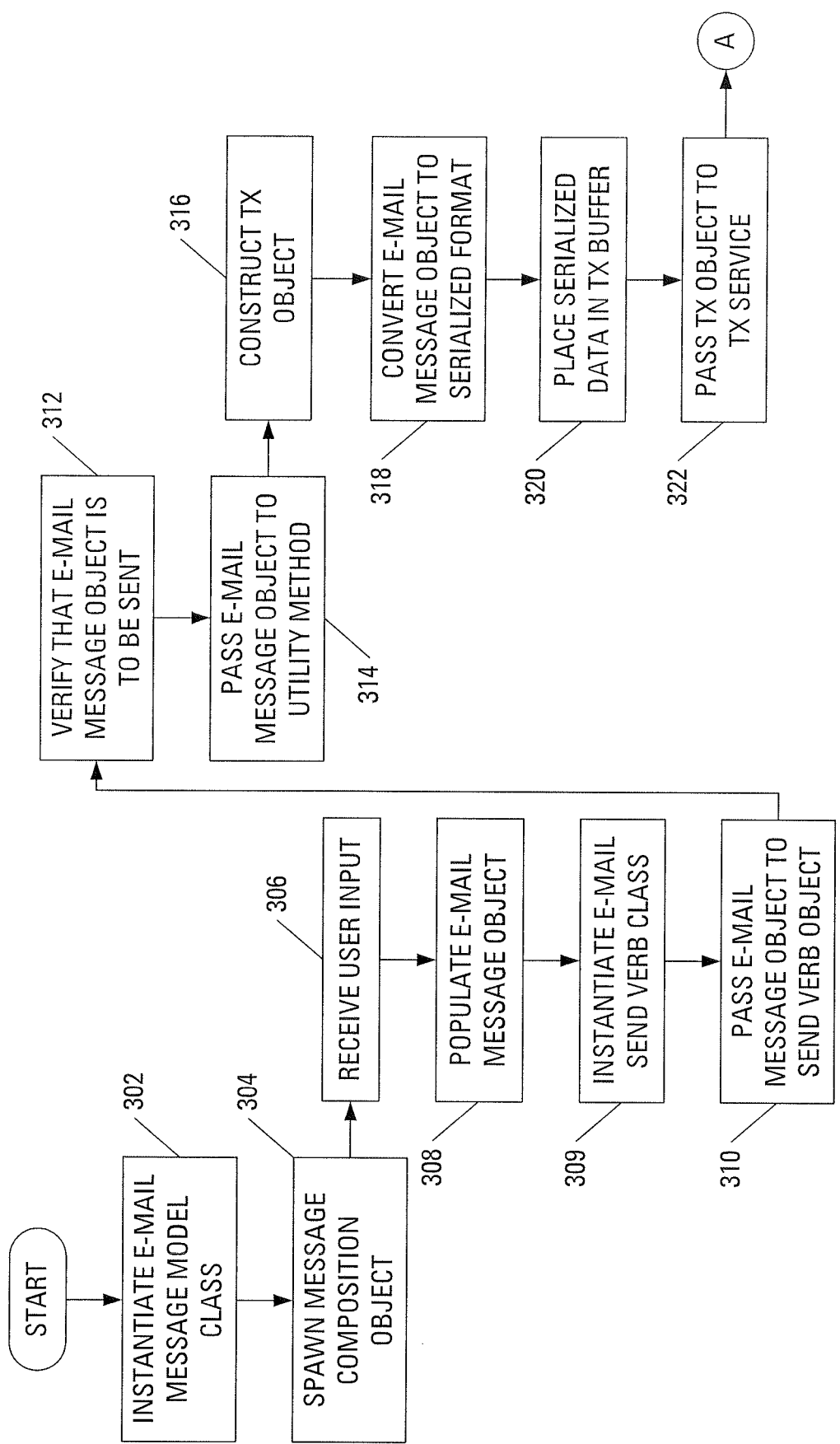
FIG. 3 illustrates steps carried out on the wireless mobile communication device by methods associated with an e-mail message Compose verb class.

Methods associated with the e-mail message Compose verb class, may then execute the steps illustrated in FIG. 3.

Initially, the e-mail message Compose verb object constructs a new e-mail message object according, in part, to an e-mail message model class, that is, the e-mail message Compose verb object instantiates (step 302) the e-mail message model class. A method of the e-mail message Compose verb object then spawns (step 304) an e-mail message composition screen object to the display 226 of the first mobile device 101A. The e-mail message composition screen object may have a number of fields. The fields are likely to include: a "To:" field, in which the user may specify an e-mail address for one or more primary recipients; a "CC:" field, in which the user may specify an e-mail address for one or more secondary recipients; a "BCC:" field, in which the user may specify an e-mail address for one or more secondary recipients whose addresses are not to be revealed to other recipients; a "Subject:" field, in which the user may specify a descriptive subject for the e-mail message in composition; and a "Body" field, in which the user may provide the payload of the e-mail message object.

In view of the e-mail message composition screen, the user may input, in the "To:" field, a destination e-mail address for the new e-mail message object. In particular, the user may specify the name of an entry in the database maintained by the address book application. Given that it is an e-mail message that is being composed, the e-mail message composition screen object selects the e-mail address specified in the e-mail address field of the address book entry. If there are more than one e-mail addresses specified in the address book entry, the e-mail message composition screen object may cause a dialog to appear on the display 226 of the first mobile device 101A requesting that the user select one of the more than one e-mail addresses. Additionally, the user may input, in the "Subject:" field, a subject for the new e-mail message object. Finally, the user may input, in the "Body" field, the text of the message that is intended to be relayed to the recipient associated with the destination e-mail address. The e-mail message composition screen object receives (step 306) this user input and uses the input to populate (step 308) the new e-mail message object.

As discussed above, the new e-mail message object may be associated with a "Send" action. As such, a "Send" menu item, associated with an e-mail message Send verb class, may appear in a menu caused to appear while the user is in view of the e-mail message composition screen. As a result of the selection of the "Send" menu item, the e-mail message composition screen object instantiates (step 309) the e-mail message Send verb class.

The e-mail message composition screen object then passes (step 310) the new e-mail message object to the e-mail message Send verb object. The e-mail message Send verb object verifies (step 312) that the new e-mail message object should be sent. In verifying that the new e-mail message object should be sent, the e-mail message Send verb object may check a policy to determine whether the user is allowed to send, may check a policy to determine whether the user is to be prompted before sending, may check that the destination e-mail addresses specified for the new e-mail message object are resolved, may check that that a password has been provided in the case of certain types of messages, etc. Upon determining that the new e-mail message should be sent, the e-mail message Send verb object passes (step 314) the new e-mail message object to a utility method.

This utility method then may call further methods on the e-mail message object. Among the further methods is a method that constructs (step 316) a transmission object based on the new e-mail message object. The transmission object contains various headers and parameters, as well as a transmission buffer. Another of the further methods converts (step 318) the e-mail message object into a serialized format and subsequently places (step 320) the serialized data in the transmission buffer of the transmission object. The e-mail utility method then passes (step 322) the transmission object to a transmission service. Responsive to being invoked by the e-mail utility method, the transmission service encrypts (step

Figure 4:
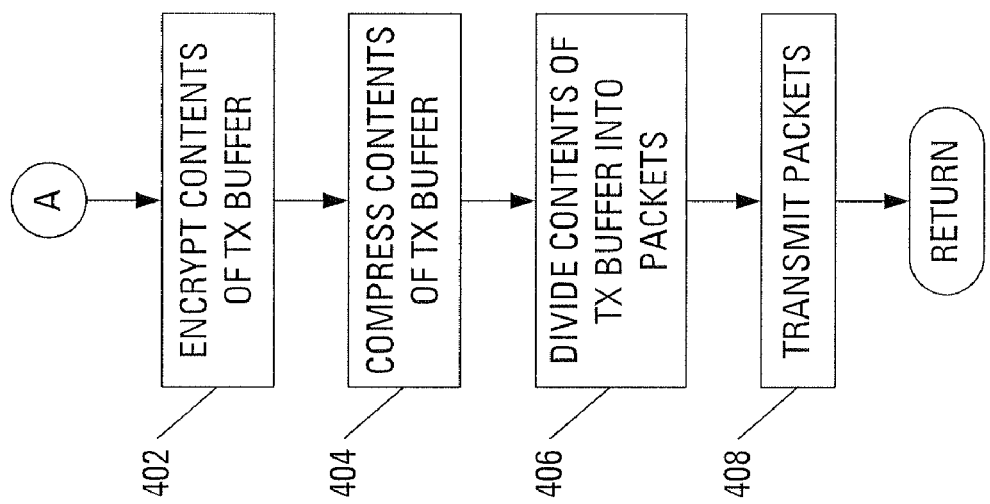
FIG. 4 illustrates steps of an exemplary e-mail message transmission method.

402, see FIG. 4) and compresses (step 404) the contents of the transmission buffer. The transmission service then divides (step 406) the compressed and encrypted contents of the transmission buffer into packets and transmits (step 408) the packets from the device first mobile device 101A.

The packets transmitted from the first mobile device 101A are received over a wireless channel at the first base station antenna 102A at the first base station subsystem 104A. The first base station subsystem 104A passes the packets to the first wireless network subsystem 106A from which the packets are passed to a relay (not shown) in the data communication network 108. The relay recognizes that the packets must be sent to the mobile device server 116 and, accordingly, routes the packets to the enterprise 110. Within the enterprise 110, the packets pass through the firewall 106 and are routed through the LAN 114 to the mobile device server 116. The mobile device server 116 decrypts and decompresses the packets to construct the e-mail message and then passes the constructed e-mail message through the LAN 114 to the enterprise mail server 118.

An acknowledgement of successful transmission may be transmitted to the first mobile device 101A by, for instance, the relay or the mobile device server 116. Receipt of such an acknowledgement of successful transmission may be indicated to a user of the first mobile device 101A by, for instance, showing a particular icon associated with a reference to the sent message in a user interface.

The enterprise mail server 118 considers the constructed e-mail message, in particular, to determine a value for at least one destination address provided as part of the e-mail message. The enterprise mail server 118 then transmits the e-mail message through the LAN 114 and the firewall 106 to the data communications network 108 toward an e-mail server associated with the e-mail destination address. For example, if the e-mail destination address of the e-mail message is associated with the e-mail server 120, the enterprise mail server 118 transmits the e-mail message to the e-mail server 120. Additionally, the enterprise mail server 118 may save a copy of the e-mail message in a "Sent Items" folder associated with the sender.

A user of the desktop computer 122 may subsequently execute a mail client application on the desktop computer 122. The mail client application may communicate with the e-mail server 120 to obtain e-mail messages addressed to the user.

Akin to the above-described creation of an outgoing e-mail message, it is typical for a user to interact with a user interface object to create a new SMS message as an instance of an SMS message model class, which defines an organization of SMS message payload, routing data and other metadata. The SMS message model class may also identify those actions that may be performed on the SMS message object, such as Send, Save Draft, etc. Such actions may be performed on the SMS message object responsive to user interaction with the user interface object.

The actions that may be performed on an SMS message object may be considered to relate to instances of "verb" classes that are specific to an SMS message handling service that is external to the first mobile device 101A.

An SMS message Compose verb class may be associated with a default user interface screen object. Accordingly, while in view of the default user interface screen, a user may cause a menu to appear and may select a "Compose SMS message" menu item. As a result of the selection of the "Compose SMS message" menu item, the user interface object may instantiate the SMS message Compose verb class.

Figure 5:
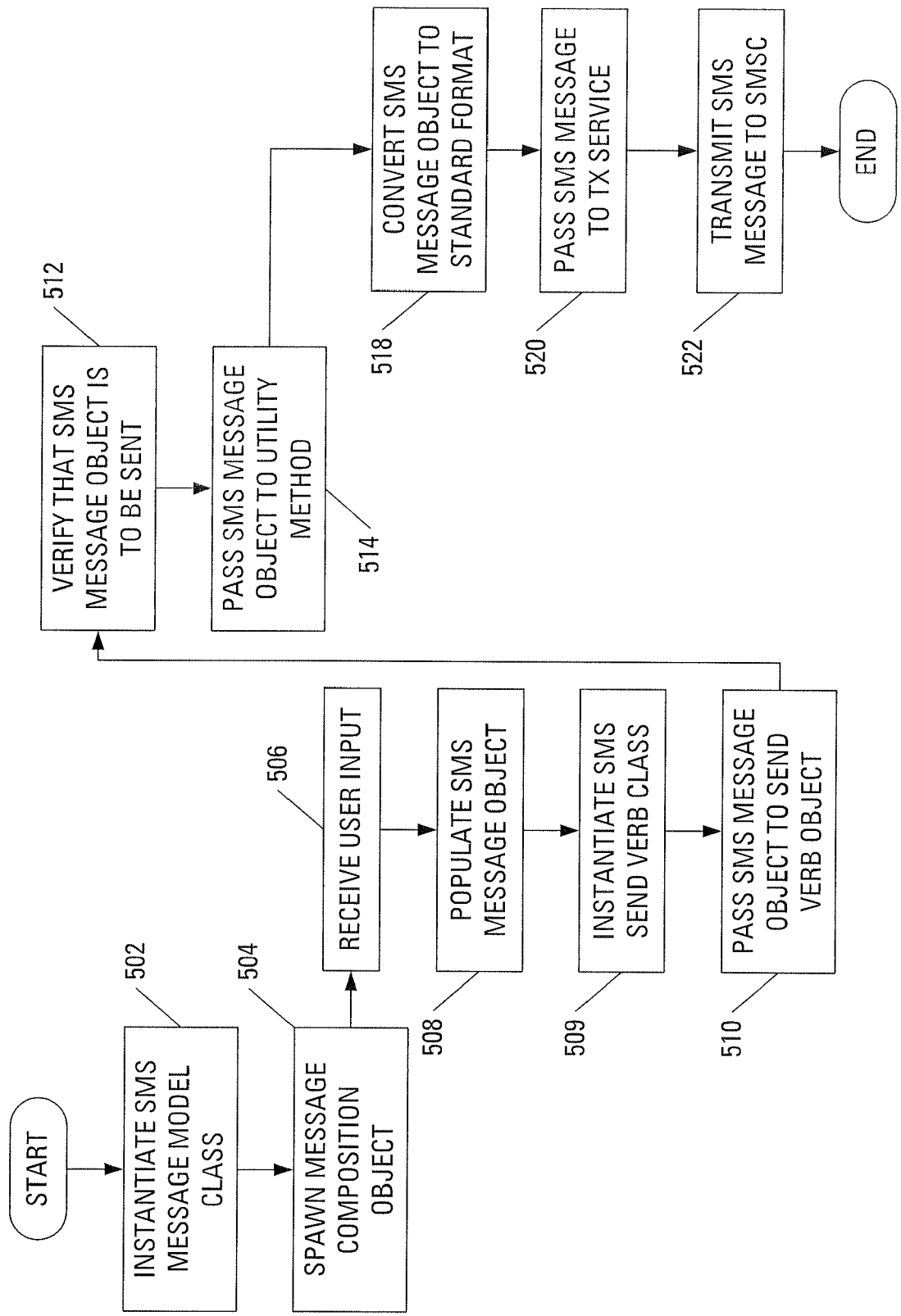
FIG. 5 illustrates steps carried out on the wireless mobile communication device by methods associated with the SMS message Compose verb class.

Methods associated with the SMS message Compose verb class, may then execute the steps illustrated in FIG. 5.

Initially, the SMS message Compose verb object constructs a new SMS message object according, in part, to an SMS message model class, that is, the SMS message Compose verb object instantiates (step 502) the SMS message model class. A method of the SMS message Compose verb object may then spawn (step 504) an SMS message composition screen object to the display 226 of the first mobile device 101A. The SMS message composition screen object may have a number of fields. The fields are likely to include: a "To:" field, in which the user may specify an SMS destination address for a single recipient device; and a "Body" field, in which the user may provide the payload of the SMS message object.

In view of the SMS message composition screen object, the user may input, in the "To:" field, an SMS destination address for a recipient device (say, the second mobile device 101B). Additionally, the user may input, in the "Body" field, the text of the message that is intended to be relayed to the user associated with the recipient device. The SMS message composition screen object receives (step 506) this user input and uses the input to populate (step 508) the new SMS message object.

As discussed above, the new SMS message object may be associated with a "Send" action. As such, a "Send" menu item, associated with an SMS message Send verb class, may appear in a menu caused to appear while the user is in view of the SMS message composition screen. As a result of the selection of the "Send" menu item, the SMS message composition screen object instantiates (step 509) the SMS message Send verb class to generate an SMS message Send verb object.

The SMS message composition screen object then passes (step 510) the new SMS message object to the SMS message Send verb object. The SMS message Send verb object verifies (step 512) that the new SMS message object should be sent. Upon verifying that the new SMS message should be sent, the SMS message Send verb object calls (step 514) an SMS utility method.

This utility method then may call further methods on the SMS message object. Among the further methods is a method that converts (step 518) the object representation of the new SMS message object to a standards-compliant SMS message and subsequently sends the converted SMS message to a transmission buffer. The SMS utility method then passes (step 520) the converted SMS message to a transmission service. Responsive to being passed the converted SMS message, the transmission service then transmits (step 522) the converted SMS message over the wireless link between the first mobile device 101A and the first base station antenna 102A at the first base station subsystem 104A.

The first base station subsystem 104A then sends the SMS message to the SMSC in the first wireless network subsystem 106A. After processing the SMS message internally, the SMSC passes the SMS message to a Gateway Mobile Services Switching Center (not shown). The Gateway Mobile Services Switching Center sends a request to the Home Location Register associated with the recipient device and receives routing information for the recipient. The Gateway Mobile Services Switching Center uses the routing information received from the Home Location Register to select a Mobile Services Switching Center associated with the recipient device and transmits the SMS message thereto. The Mobile Services Switching Center collects information related to the recipient device from the Visitor Location Register. Using information form the Visitor Location Register, and assuming the recipient device is the second mobile device 101B, the Mobile Services Switching Center transmits the SMS message to the second base station subsystem 104B. Upon receipt of the SMS message, the second mobile device 101B transmits the SMS message to the second mobile device 101B.

An acknowledgement of successful transmission may be transmitted to the first mobile device 101A by, for instance, the SMSC. Receipt of such an acknowledgement of successful transmission may be indicated to a user of the first mobile device 101A by, for instance, showing a particular icon associated with a reference to the sent SMS message in a user interface.

Clearly, separate message Compose objects are required if a user is to compose a message for transmission using an e-mail transport and a message for transmission using an SMS transport. It is thus difficult to compose a single message for delivery to multiple destination addresses using multiple transports.

In overview, a single user interface message composition screen allows the creation of a message having destination addresses associated with multiple transports. In part, this is accomplished through the provision of a generic message model class which is instantiated in place of either instantiating (step 302) the e-mail message model class or instantiating (step 502) the SMS message model class. When message composition is complete, the message is processed and used to populate at least one message specific to one of the transports. Send verb classes are then instantiated for each of the transports for which a message has been populated so that the transport-specific messages may be transmitted in a typical fashion. Optionally, each transport-specific message includes an indication of the destination addresses for the other transports. Such an inclusion allows for a multiple-transport "reply-to-all" message to be created by a receiving device.

A generic message Compose verb class may be associated with a default user interface screen object. Accordingly, while in view of the default user interface screen, a user may cause a menu to appear and may select a "Compose message" menu item. As a result of the selection of the "Compose message" menu item, the user interface object may instantiate the generic message Compose verb class.

Figure 6:
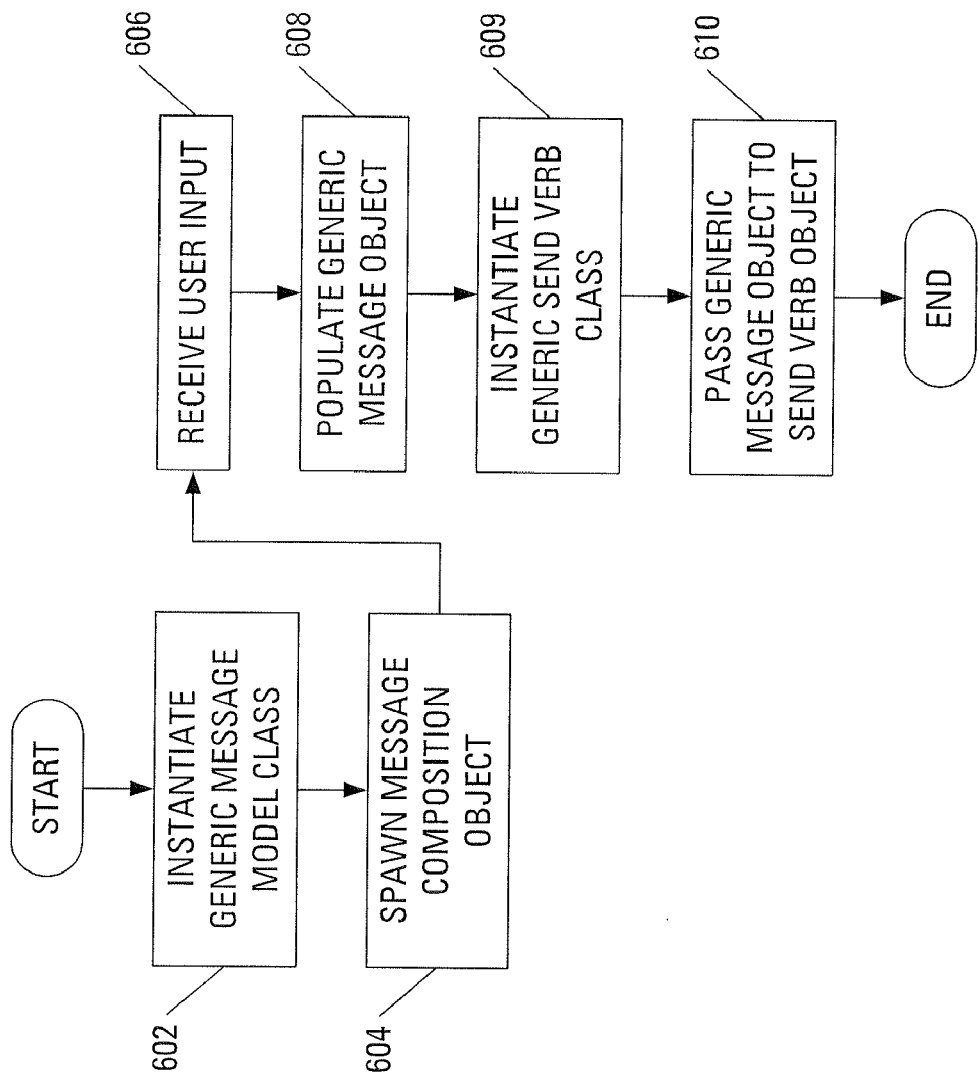
FIG. 6 illustrates steps carried out by methods associated with a generic message Compose verb class according to an embodiment.

Methods associated with the generic message Compose verb class, may then execute the steps, illustrated in FIG. 6, in an exemplary method of handling an outgoing multiple-transport message.

Initially, the generic message Compose verb object constructs a new generic message object according to a generic message model class, that is, the generic message Compose verb object instantiates (step 602) the generic message model class. A method of the generic message Compose verb object then spawns (step 604) a generic message composition screen object to the display 226 of the first mobile device 101A. The generic message composition screen object may have a number of fields. The fields are likely to include: a "To:" field, in which the user may specify an address for one or more primary recipients; a "CC:" field, in which the user may specify an address for one or more secondary recipients; a "BCC:" field, in which the user may specify an e-mail address for one or more secondary recipients whose addresses are not to be revealed to other recipients; a "Subject:" field, in which the user may specify a descriptive subject for the generic message in composition; and a "Body" field, in which the user may provide the payload of the generic message object.

In view of the generic message composition screen, the user may input, in the "To:" field, a destination address for the new generic message object. In particular, the user may specify the name of an entry in the database maintained by the address book application. Given that it is a generic message that is being composed, the generic message composition screen object prompts the user to select a transport (e.g., e-mail, SMS) among the transports associated with the addresses specified in the various address fields of the address book entry. If there are multiple addresses for multiple transports specified in the address book entry, the generic message composition screen object may cause a dialog to appear on the display 226 of the first mobile device 101A requesting that the user select one of the multiple addresses (if such is the case) for the selected transport. For example, if the address book entry has two e-mail addresses and a mobile telephone number, the user interface of the generic message composition screen object may cause a first dialog to appear to allow a selection between the e-mail transport and the SMS transport. Subsequently, in the case wherein the user has selected the e-mail transport, the generic message composition screen object may cause a dialog to appear to allow a selection between the two e-mail addresses.

Alternatively, to simplify the user interface once a recipient has been selected from among the address book entries, the generic message composition screen object may cause a dialog to appear to allow a selection from among the two e-mail addresses and the mobile telephone number.

That is, the transport may be explicitly selected or may be implicit in the selection of the destination address.

It will be appreciated that once the user has selected a destination address by identifying a transport and selecting a recipient, the user is free to change the transport and/or address of that recipient at any time before sending the message.

Also, after typing in a name, the user could specify the transport, then select the destination address (or receive an error if no valid address for that transport exists). Alternatively, the user could specify the recipient, then the transport. Additionally, once the user has specified a recipient, the microprocessor 228 may automatically choose the appropriate transport by considering various transports in a predetermined order. That is, the microprocessor 228 may select the e-mail transport if the specified recipient is associated with an e-mail address. However, if the specified recipient is not associated with an e-mail address, the microprocessor 228 may select the SMS transport if the specified recipient is associated with an SMS destination address. The user can configure the predetermined order of consideration of transports in advance.

Further alternatively, the user could select a transport first, then select a recipient, then an appropriate address for that name that matches the transport.

Additionally, the user may input, in the "Subject:" field, a subject for the new generic message object. Finally, the user may input, in the "Body" field, the text of the message that is intended to be relayed to the recipient associated with the selected address book entry. The generic message composition screen object receives (step 606) this user input and uses the input to populate (step 608) the new generic message object.

As discussed above, the new generic message object may be associated with a "Send" action. As such, a "Send" menu item, associated with a generic message Send verb class, may appear in a menu caused to appear while the user is in view of the generic message composition screen. As a result of the selection of the "Send" menu item, the generic message composition screen object instantiates (step 609) the generic message Send verb class to process the new generic message object. The generic message composition screen object then passes (step 610) the new generic message object to the generic message Send verb object.

Figure 7:
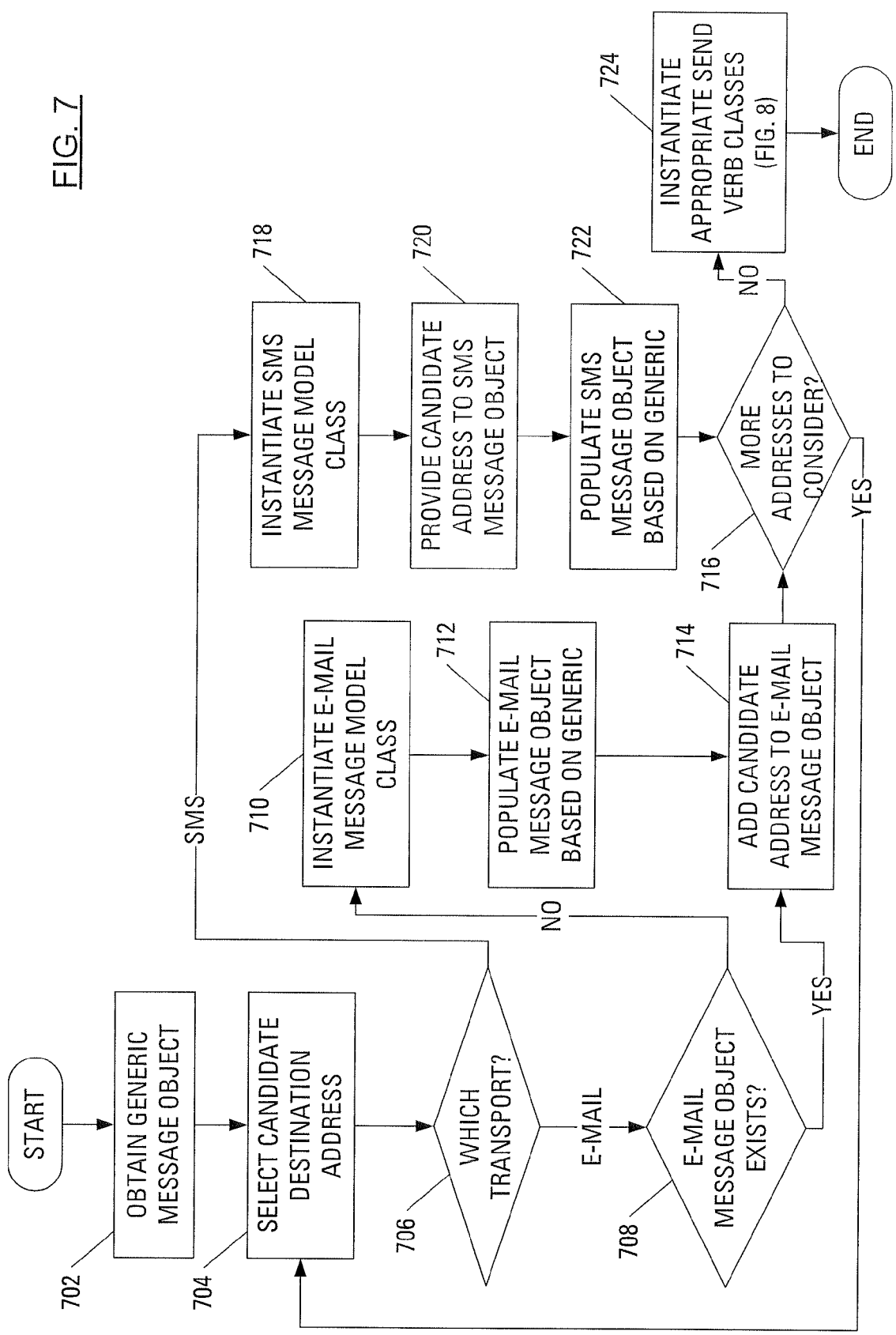
FIG. 7 illustrates steps of an exemplary method carried out by the generic message Send verb object according to an embodiment.

Steps of an exemplary method carried out by the generic message Send verb object are illustrated in FIG. 7. Initially, the generic message Send verb object obtains (step 702) the new generic message object.

As the generic message Send verb object is designed to process a message having multiple specified recipients with the specified recipients potentially being associated with multiple transports, the generic message Send verb object selects (step 704) one of the specified recipient addresses as a candidate address. The generic message Send verb object then determines (step 706) the transport that is associated with the candidate address.

If the transport is determined to be the e-mail transport, the generic message Send verb object determines (step 708) whether the e-mail message model class has been instantiated, that is, whether an e-mail message object exists. In the case wherein an e-mail message object does not already exist, the generic message Send verb object instantiates (step 710) the e-mail message model class and populates (step 712) the e-mail message object based on the contents of various non-address fields of the generic message object. For example, the generic message Send verb object uses the contents of the "Subject" field of the generic message object to populate the "Subject" field of the e-mail message object and uses the contents of the "Body" field of the generic message object to populate the "Body" field of the e-mail message object. The generic message Send verb object then adds (step 714) the candidate address to one of the address fields (e.g., "To", "CC", "BCC") of the e-mail message object. In particular, the candidate address is placed in an address field of the e-mail message object corresponding to the address field of the generic message object from which the candidate message has been selected.

In the case wherein an e-mail message object already exists, the generic message Send verb object merely adds (step 714) the candidate address to the corresponding address field of the existing e-mail message object.

Figure 8:
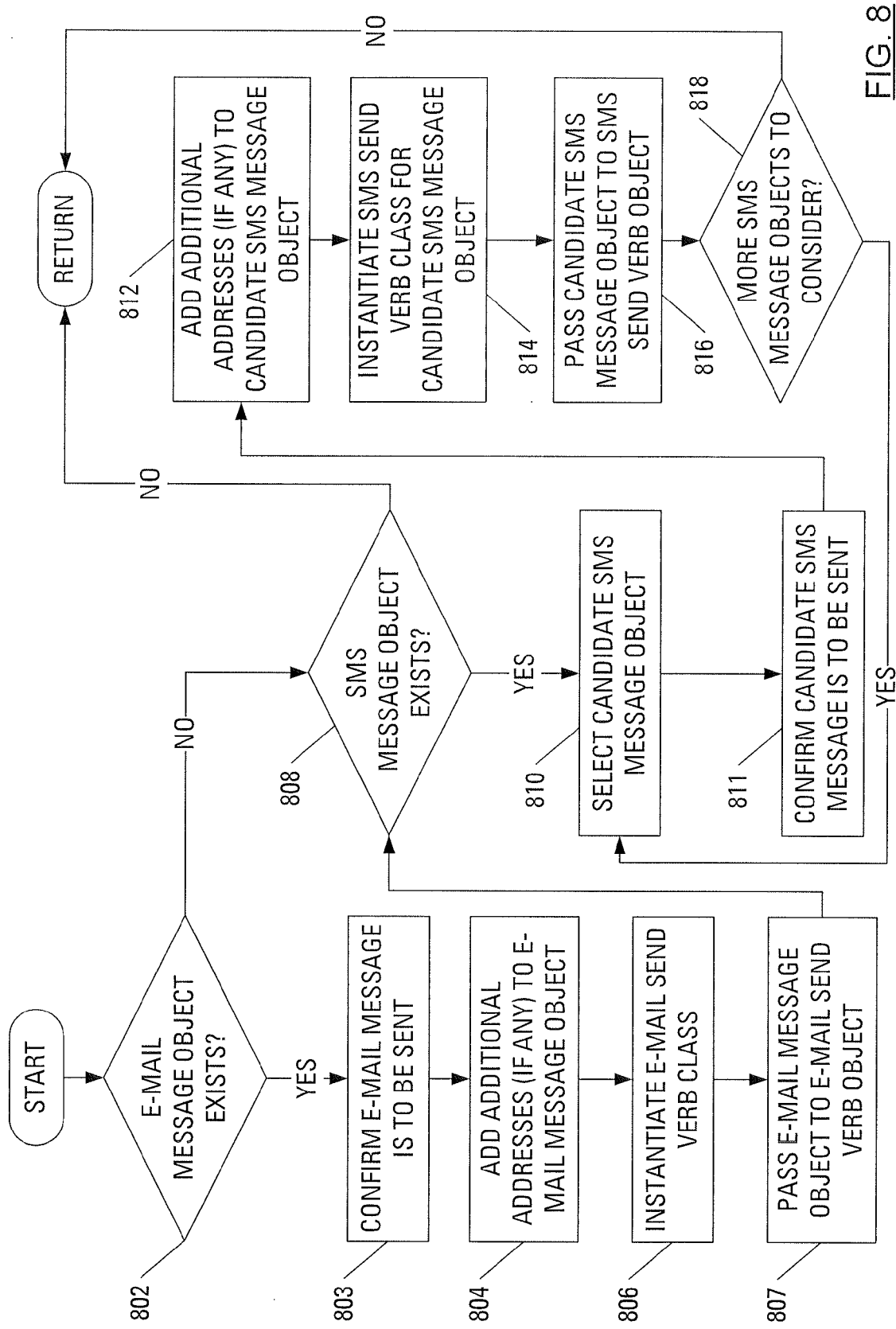
FIG. 8 illustrates steps of an exemplary method of instantiating Send verb classes for the message objects, which have been created in FIG. 7, according to an embodiment.

In either case, the generic message Send verb object then determines (step 716) whether there are further addresses to consider. If there are no further addresses to consider, the generic message Send verb object instantiates (step 724) Send verb classes for the message objects that have been created. The steps of such instantiation are illustrated in FIG. 8 and will be discussed further below.

If there are further addresses to consider, the generic message Send verb object selects (step 704) a new candidate address and determines (step 706) the transport that is associated with the new candidate address.

If the transport is determined (step 706) to be the SMS transport, the generic message Send verb object instantiates (step 718) the SMS message model class. The generic message Send verb object then provides (step 720) the new candidate address as the sole destination for the SMS message object and populates (step 722) the SMS message object based on the contents of various non-address fields of the generic message object. For example, the generic message Send verb object uses the contents of the "Subject" field of the generic message object to populate the "Payload" field of the SMS message object and uses the contents of the "Body" field of the generic message object to populate the rest of the "Payload" field of the SMS message object.

Notably, a standard-compliant SMS message has a 140-byte "Payload" field. As such, the contents of the "Payload" field are limited to 160 7-bit characters. If the contents of the "Subject" and "Body" fields of the generic message object exceed the character limit of a single SMS message, the generic message Send verb object may instantiate (not shown) the SMS message model class to create as many further SMS message objects as are necessary to carry the contents of the "Subject" and "Body" fields of the generic message object. That is, the new generic message object obtained in step 702 may be broken up into portions for SMS transmission.

Once the SMS message object(s) has been populated, the generic message Send verb object determines (step 716) whether there are further addresses to consider. If there are further addresses to consider, the generic message Send verb object selects (step 704) another candidate address and determines (step 706) the transport that is associated with the candidate address. However, if there are no further addresses to consider, the generic message Send verb object instantiates (step 724) Send verb classes for the message objects that have been created.

FIG. 8 illustrates steps in an exemplary method of instantiating Send verb classes for the message objects that have been created. Initially, the generic message Send verb object considers all of the message objects that have been created (in steps 710 and 718) to determine (step 802) whether there is an e-mail message object among the message objects.

Notably, since an e-mail message may specify multiple recipients, the result of the processing illustrated in FIG. 7 is unlikely to include more than one e-mail message object. Conversely, an SMS message according to current standards may only be addressed to a single destination address. In the event that the generic message object specifies multiple SMS destination addresses, the result of the processing illustrated in FIG. 7 will be multiple SMS message objects, one SMS message object for each of the multiple SMS destination addresses. Indeed, even if only a single SMS destination address is specified in the generic message object, but the contents of the generic message object exceed the capacity of the payload field of a single SMS message, the result of the processing illustrated in FIG. 7 will be multiple SMS message objects.

If the generic message Send verb object determines (step 802) that there is an e-mail message object among the message objects, the generic message Send verb object optionally confirms (step 803), through interface with the user, that the e-mail message is to be sent. For instance, the generic message Send verb object may display the e-mail message to the user associated with a dialog box requesting confirmation that the e-mail message is to be sent. The generic message Send verb object then optionally amends (step 804) the e-mail message object to add, say, to the beginning of the "Body" field, additional destination addresses that are specified in the generic message object and not otherwise identifiable in the e-mail message object. An e-mail message may be addressed to multiple e-mail destination addresses and, as such, the additional destination addresses are the destination addresses on other transports. Advantageously, such an inclusion of the additional destination addresses allows a recipient to use a "reply-to-all" command to create a generic message object that specifies the address of the sender of the original generic message object in addition to all of the other addresses specified in the original generic message object, without regard to transport. It should be clear to a person of ordinary skill that, to maintain privacy, any addresses specified in the BCC field would not be added here.

The generic message Send verb object then instantiates (step 806) the e-mail message Send verb class and passes (step 807) the e-mail message object to the e-mail message Send verb object. The e-mail message Send verb object then processes (not shown) the e-mail message object in a manner familiar from steps 312, 314, 316, 318, 320 and 322 of FIG. 3 and steps 402, 404, 406 and 408 of FIG. 4.

The generic message Send verb object then determines (step 808) whether there is at least one SMS message object to act upon. If an SMS message object does not exist, the method is complete, however, if an SMS message object does exist, generic message Send verb object then selects (step 810) a candidate SMS message object. The generic message Send verb object then optionally confirms (step 811), through interface with the user, that the candidate SMS message object is to be sent. For instance, the generic message Send verb object may display the candidate SMS message object to the user associated with a dialog box requesting confirmation that the candidate SMS message object is to be sent. The generic message Send verb object optionally amends (step 812) the candidate SMS message object to add, say, to the beginning of the "Payload" field, additional destination addresses that are specified in the generic message object and not otherwise identifiable in the SMS message object. An SMS message may only be addressed to a single destination addresses and, as such, the additional destination addresses are the destination addresses on other transports as well as any further SMS destination addresses. Advantageously, such an inclusion of the additional destination addresses allows a recipient to use a "reply-to-all" command to create a generic message object that specifies the address of the sender of the original generic message object in addition to all of the other addresses specified in the original generic message object, without regard to transport. The format of the additional addresses may appear as follows:

[To: Nigel Ibsez (nibsez@shn.com)—Email]
[CC: Joe Smith (519-555-1212)—SMS]

The generic message Send verb object then instantiates (step 814) the SMS message Send verb class and passes (step 816) the candidate SMS message object to the SMS message Send verb object. The SMS message Send verb object then processes (not shown) the candidate SMS message object in a manner familiar from steps 512, 514, 516, 518, 520 and 522 of FIG. 5. The generic message Send verb object then determines (step 818) whether there exist further SMS message objects to consider. If there are further SMS message objects to consider, the generic message Send verb object selects (step 810) a further candidate SMS message object and performs steps 812, 814 and 816 on the further candidate SMS message object. If further SMS message objects do not exist, the method is complete.

The generic message Send verb object then instantiates (step 814) the SMS message Send verb class and passes (step 816) the candidate SMS message object to the SMS message Send verb object.

As discussed above, an acknowledgement of successful transmission may be transmitted to the first mobile device 101A by a network element in the path between the first mobile device 101A and a recipient device. When, as described herein, the creation of a message having destination addresses associated with multiple transports leads to the transmission, from the first mobile device 101A, of several separate messages, it can be anticipated that an acknowledgement of successful transmission will be received by the first mobile device 101A for each of the several separate messages. For example, a message specifying three e-mail addresses and two SMS addresses would lead to the transmission of at least three messages (one e-mail message and at least two SMS messages). It may be anticipated that at least three separate acknowledgements of successful transmission may be received.

The first mobile device 101A may handle these acknowledgements by displaying three references to the sent message, each of the three references having a corresponding icon (say, a checkmark) indicating successful transmission. Alternatively, only a single reference to the sent message may appear in the user interface screen with an icon that indicates a degree of success. For instance, two different icons may be used to represent two success conditions: receipt of at least some acknowledgements of successful transmission pending; and all acknowledgements of successful transmission received.

As has been discussed above in passing, different transports have different limitations. In particular, an SMS message is limited to a payload of 160 7-bit characters and may only be addressed to a single destination. Aspects of the present application not only allow for the creation of a generic message object with destination addresses on different transports, but also allow, through the use of the generic message object, for a single message to be addressed multiple SMS destination addresses, even if no e-mail addresses are specified.

It is contemplated that the generic message composition screen object may alter the user interface presented on the display 226 of the first mobile device 101A responsive to recognizing that the user has specified at least one SMS destination address in one of the addressing fields. In particular, such altering may involve inserting a special character at the point in the exceeded the capacity of a single SMS message. As has been discussed, the "Payload" field of a single SMS message is limited to 160 7-bit characters. Accordingly, the generic message composition screen object may insert the special character in the user interface presented on the display 226 between the $160^{th}$ character and the $161^{st}$ character.

It is typical that, on some devices that are arranged to receive SMS messages, received and sent SMS messages are grouped. That is, all messages that a given device has received from a given SMS destination address and all messages sent from the given device to the given SMS destination address may be grouped together in a user interface so that SMS messages related to a single thread, i.e., a discussion on a particular topic, may be reviewed together and in chronological order. It has been contemplated that the generic message object instantiated in step 602 may include a unique identifier. Advantageously, in cases wherein the unique identifier is included in the e-mail message object populated (step 712, FIG. 7) based on the generic message object and in cases wherein the unique identifier is included in the SMS message object populated (step 722) based on the generic message object, a recipient device may group related messaged together. That is, the recipient device may recognize the unique identifier in incoming messages and may group together those messages (e-mail messages and SMS messages) that have a unique identifier in common.

Although aspects of the application have been described with reference to e-mail messages and SMS messages, a person of ordinary skill in the art is expected to appreciate that further transports may be available to a message sending and receiving device. Such further transports may include one or more known Instant Messaging (IM) transports, the known Multimedia Messaging Service (MMS) as well as proprietary device-to-device message transports. Clearly, the application is not intended to be limited to mobile communication devices. A desktop workstation or notebook computer could equally gain, through implementation of this application, an ability to transmit a single message on multiple transports, e.g., e-mail and IM.

Advantageously, a device executing a multi-transport client application module 230C that implements aspects of the above-described application may receive an e-mail message and, using a generic message object, reply over the e-mail transport to the sender while sending a copy of the reply, over the SMS transport, to another interested party.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method in a mobile device of handling a message for transmission on multiple transports, said method comprising:
   obtaining, via a user interface associated with multiple transports, a first message comprising message content and specifying a first destination address and a second destination address, wherein the first destination address is associated with a first transport and the second destination address is associated with a second transport;
   for the first destination address, transmitting the first message over the first transport; and
   for the second destination address:
      populating a second message based on said first message;
      amending said second message to include specification of said first destination address, wherein said first destination address is not associated with said second transport; and
      transmitting said second message over said second transport to said second destination address.

2. The method of claim 1 wherein said second message has a format specific to said second transport.

3. The method of claim 2 wherein said format specific to said second transport comprises a character limit, and wherein the method further comprises:
   if the message content exceeds the character limit:
      populating additional messages based on portions of the first message and based on said format specific to said second transport; and
      transmitting the additional messages over said second transport.

4. The method of claim 1 populating said second message comprises selecting a candidate message that is already associated with the second transport and populating message fields of the candidate message based on said first message.

5. The method of claim 1 wherein said first transport is one of an electronic mail transport, a Short Messaging Service transport, a Multimedia Messaging Service transport and an Instant messaging transport.

6. The method of claim 5 wherein said second transport is a different one of an electronic mail transport is one of an electronic mail transport, a Short Messaging Service transport, a Multimedia Messaging Service transport and an Instant messaging transport, different from said first transport.

7. An apparatus comprising:
   a transmitter;
   a processor adapted to:
      obtain, via a user interface associated with multiple transports, a first message comprising message content and specifying first destination address and a second destination address, wherein the first destination address is associated with a first transport and the second destination address is associated with a second transport;
      for the first destination address:
         transmit the first message over the first transport;
      for the second destination address:
         determine that said second destination address is associated with said second transport;
         populate a second message based on said first message;
         amend said second message to include specification of said first destination address, wherein said first destination address is not associated with said second transport; and
         transmit, via said transmitter, said second message over said second transport to said second destination address.

8. A non-transitory computer readable medium containing computer-executable instructions that, when performed by a processor, cause said processor to:
   obtain, via a user interface associated with multiple transports, a first message comprising message content and specifying a first destination address and a second destination address, wherein the first destination address is associated with a first transport and the second destination address is associated with a second transport;
   for the first destination address:
      transmit the first message over the first transport;
   for the second destination address:
      determine that said second destination address is associated with said second transport;
      populate a second message based on said first message;
      amend said second message to include specification of said first destination address, wherein said first destination address is not associated with said second transport; and
      transmit said second message over said second transport to said second destination address.

9. A method in a mobile device capable of transmitting messages in a first transport and a second transport, said method comprising:
   providing a message composition object operable to receive user input;
   receiving user input comprising message content and specifying at least a first destination address associated with a first transport and a second destination address associated with a second transport; and
   upon receiving selection of a send command associated with the message composition object, transmitting a first message via the first transport, wherein the first message comprises at least a portion of the message content and a specification of the second destination address.

10. The method of claim 9, further comprising:
   upon receiving said selection of said send command, transmitting a second message via the second transport, wherein the second message comprises at least the portion of the message content and a specification of the first destination address.

11. The method of claim 9, wherein transmitting the first message via the first transport comprising populating the first message based on the message content in a format specific to the first transport.

12. The method of claim 11, wherein the format specific to the first transport comprises a character limit, and the first message comprises a portion of the message content in accordance with the character limit.

13. The method of claim 12, further comprising:
   transmitting further messages via the first transport with additional portions of the message content.

14. The method of claim 9, wherein transmitting the first message via the first transport comprises:
   selecting a candidate message that is already associated with the first transport and populating the candidate message based on the message content.

15. The method of claim 9, wherein transmitting the first message that includes the specification of the second destination address enables a recipient of the first message to use a reply-to-all command to create a reply message including the second destination address associated with the second transport.

16. The method of claim 9, wherein the message composition object operable to a create a reply-to-all message associated with multiple transports.

17. The method of claim 9, wherein the step of providing the message composition object occurs in response to a reply-to-all command associated with a previously received multi-transport message.

* * * * *